April 15, 1958 R. S. WOODRUFF, SR 2,830,835
BOAT AWNING SUPPORT
Filed Aug. 17, 1955
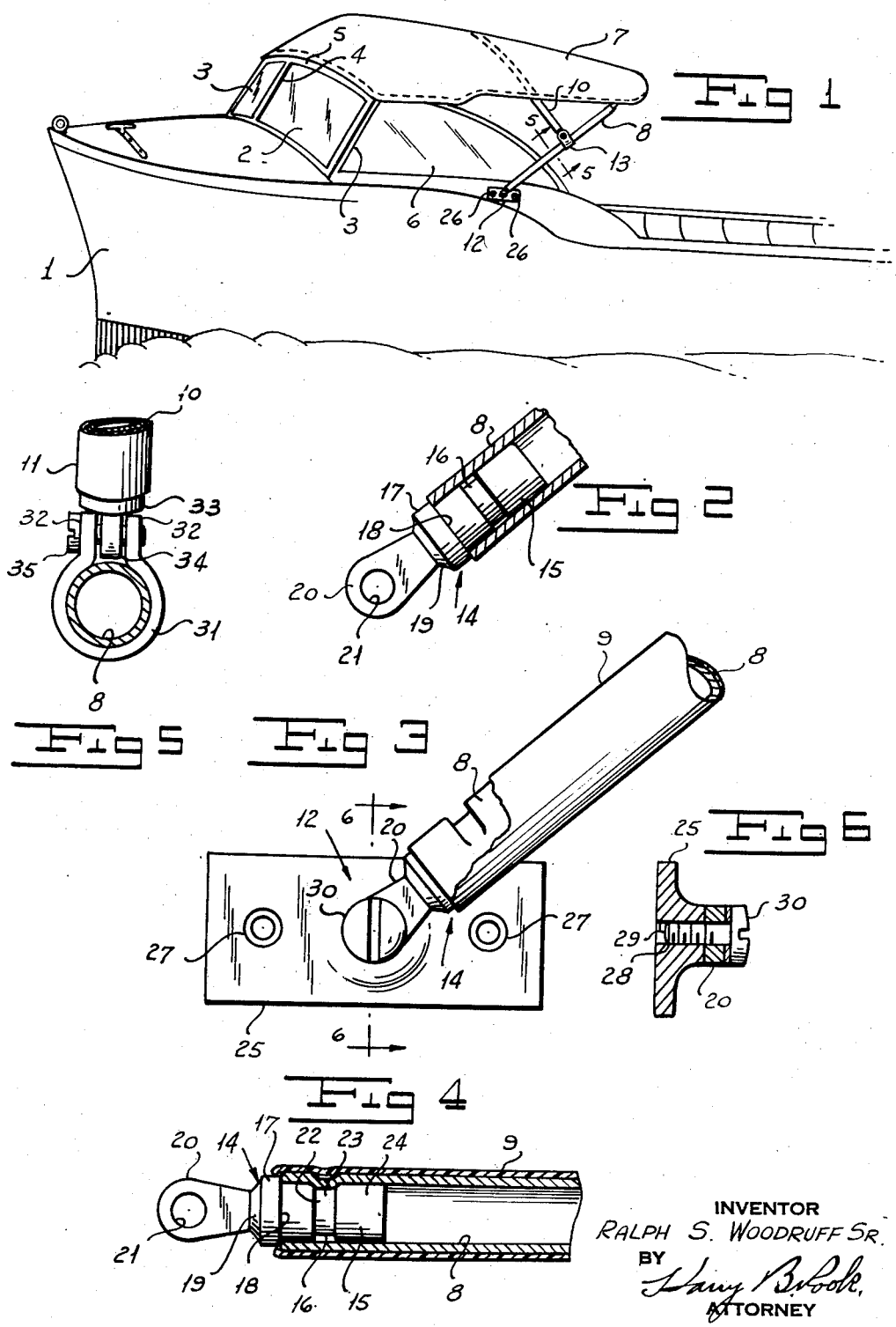
INVENTOR
RALPH S. WOODRUFF SR.
BY
Harry Brook,
ATTORNEY

United States Patent Office 2,830,835
Patented Apr. 15, 1958.

2,830,835

BOAT AWNING SUPPORT

Ralph S. Woodruff, Sr., Point Pleasant, N. J.

Application August 17, 1955, Serial No. 529,042

2 Claims. (Cl. 287—115)

This invention relates generally to tubular supports or frames for boat awnings or canopies and more particularly to a new and improved joint structure for connecting the ends of the tubular frame members to fastening devices.

A prime object of the present invention is to provide a joint structure of this kind which is simple in construction, inexpensive of production, having a high degree of strength and stability and which is permanent in nature.

Another object of the invention is to provide a novel method of and means for effecting joints between tubular members or pipes and stationary portions of structures.

For a further comprehension of the invention and of the objects and advantages thereof, reference will be had to the following description and accompanying drawing and to the appended claims in which the various novel features of the invention are more particularly set forth.

In the accompanying drawing forming a material part of this disclosure:

Figure 1 is a perspective view of a fragment of a motor boat with a convertible top having a tubular frame embodying my invention.

Figure 2 is a side elevational view of a joint member shown in Figure 1 in position, but not secured, in the end of a tube of the frame, the tube being shown in section, the cover of the tube being omitted.

Figure 3 is a similar view but showing the joint member fastened to an attaching plate, parts being shown broken away.

Figure 4 is a view similar to Figure 2 but showing the joint member firmly secured in the tube and with the cover for the tube in position thereon.

Figure 5 is a sectional view taken on the plane of the line 5—5 of Figure 1.

Figure 6 is a sectional view taken on the plane of the line 6—6 of Figure 3.

Referring to the drawing in detail, in Figure 1 there is shown a fragment of a body 1 of any configuration, such as a small motor boat or launch, for example. The body is provided with a windshield 2, which is inclined rearwardly and has side columns 3 and a central column 4, the respective columns being connected at their upper ends by a cross member 5. The body is also provided with a window 6 at each side. A convertible type awning or canopy top 7 is also provided which may be formed of any desired material, which is water repellant and mildew proof, such as canvas. The canopy 7 is supported at its rear end by an inverted U-shaped frame 8 formed of metal cylindrical tubing and inclined rearwardly, said tubing being protected by a plastic tubular cover 9. A forwardly inclined inverted U-shaped frame 10 of metal tubing braces the canopy midway its ends and is protected by a plastic tubular cover 11.

The bottom ends of the frame 8, at each side of the body 1 is pivotally connected to the body by a joint, indicated generally at 12, said joints being made in accordance with my invention. The inverted U-shaped frames 3 and 10 are pivotally connected midway the ends of the parallel portions of frame 8 by a joint indicated generally at 13, at each side of the body 1, said joints embodying my invention.

Each joint 12 includes a joint member 14 having an elongated solid cylindrical body or shank 15 fitted in the bottom end of the tubing 8 in the form of a plug. The shank 15 has an annular groove 16 midway its ends extending throughout the circumference thereof and having parallel end walls, said plug also having an annular enlargement 17 at one end forming an abrupt shoulder 18 at its inner end, said annular enlargement continuing into a slanting shoulder 19 outwardly thereof. At its outer end, the body is formed with an elongated integrally formed flat lug 20 centrally of the body and forming an extension thereof. The lug is provided with a central opening 21 perpendicular to the axis of said shank. The adjacent end edge of the tubing 8 abuts against the inner shoulder 18 of the annular enlargement 17, and the outer plastic cover 9 fits over the tubing and the annular enlargement. In order to anchor the plug in the end of the tubing and to prevent relative longitudinal movement and provide for relative rotation therebetween, the tubing at a point opposite the annular groove in the plug is formed with an arcuate indentation of a length substantially less than the circumference of the tubing 22 which is wedged in said groove with its edges in contact with the end walls thereof.

The lug 20 of the plug 14 is connected to the respective side of the body 1 by means of a plate 25 secured to the side adjacent its top edge by fastening member 26 extending through spaced openings 27 adjacent the ends of the plate. Midway its ends, the plate is formed with a threaded opening 28. The opening 21 in the lug 20 is aligned with the threaded opening 28 in the plate and a threaded bolt 29 having a slotted head 30 extends loosely through the opening in the lug and is threaded into the opening 28 thus firmly and securely clamping the frame 8 to the body 1.

Each joint 13 between the frames 8 and 10 includes a strap having a semi-circular body 31 partly and transversely encircling the tubing of the frame 8 and having offset internally threaded perforated ears 32 at its ends. Ftted in the end of the adjacent tubing frame 10 there is a joint or plug member 33 similar in construction and arrangement to the joint or plug member 14. In order to assemble the joint, the lug 34 of joint member 33 is interposed between the perforated ears 32 of the strap, with the opening in the lug and the perforations in the ears being in alignment. A threaded and headed bolt 35 similar in construction to the bolt 29 extends through the aligned opening and perforations whereby the ears are drawn into clamping engagement with the lug whereby the frames 8 and 10 are firmly connected by rigid joints.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. Means for connecting a cylindrical tubular member to a second part including a joint member having an elongated cylindrical shank fitted into the end of said tubular member and having an extension beyond the end of said tubular member provided with an opening therethrough perpendicular to the axis of said shank to receive a fastening member for connecting the joint member to said second part, said cylindrical shank having a groove extending throughout the circumference thereof, and the wall of said tubular member having an indentation of a length substantially less than the circumference of the tubular member and extending into said circumferential groove thereby connecting said joint member and said tubular member against relative longitudinal movement and providing for relative rotation of said joint member and said tubular member.

2. Means as defined in claim 1 wherein said groove has parallel end walls, said indentation is arcuate and extends circumferentially of the tubular member with its side edges parallel to and engaging said end walls of said groove, said shank has a circumferential shoulder between said groove and said extension, and the end of said tubular member abuts said shoulder.

References Cited in the file of this patent

UNITED STATES PATENTS

| | | |
|---|---|---|
| 355,911 | Bartow | Jan. 11, 1887 |
| 1,322,250 | Lewis | Nov. 18, 1919 |
| 2,429,293 | Peck et al. | Oct. 21, 1947 |
| 2,513,764 | Vonder Ahe | July 4, 1950 |
| 2,634,740 | Duke | Apr. 14, 1953 |